Dec. 7, 1937.　　　F. W. SCHARF　　　2,101,691
ELECTRIC WATER HEATER
Filed Nov. 29, 1935　　　2 Sheets-Sheet 1
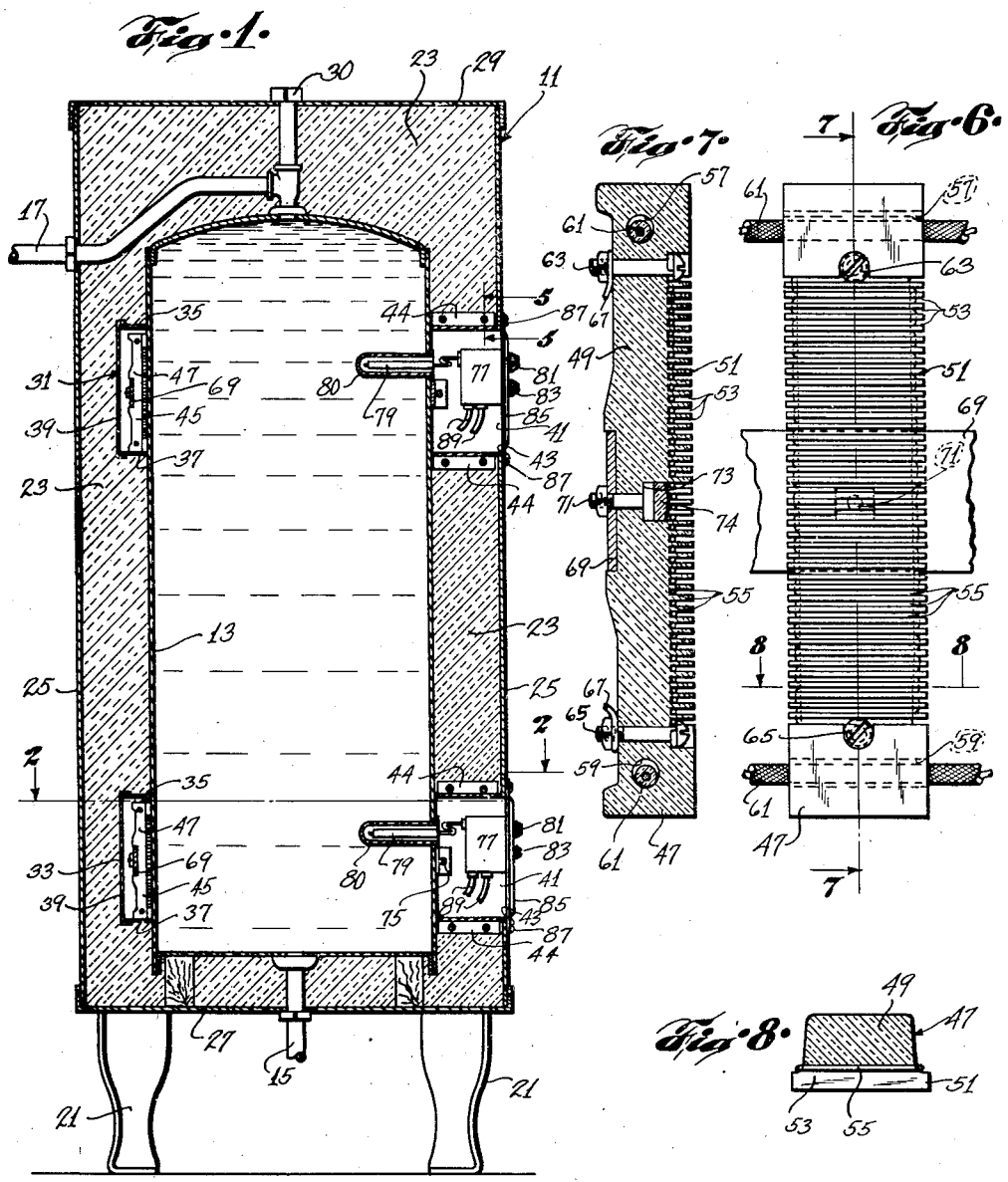
INVENTOR.
FRANK W. SCHARF
BY Roy M. Eilers
ATTORNEY.

Dec. 7, 1937.  F. W. SCHARF  2,101,691
ELECTRIC WATER HEATER
Filed Nov. 29, 1935  2 Sheets-Sheet 2
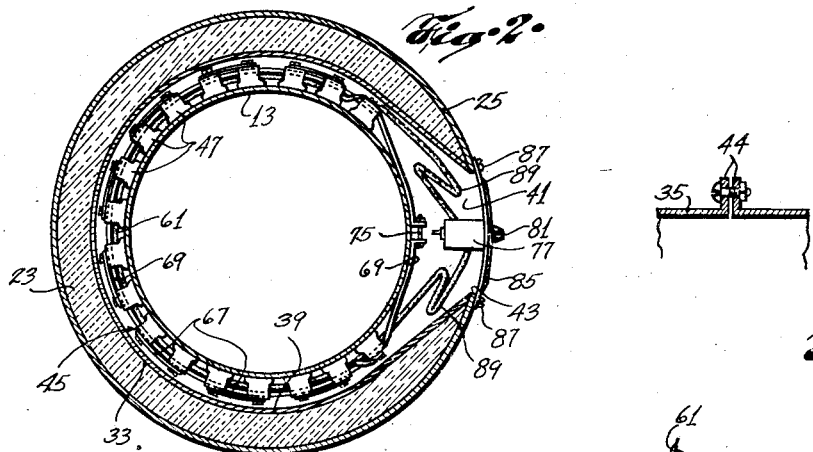
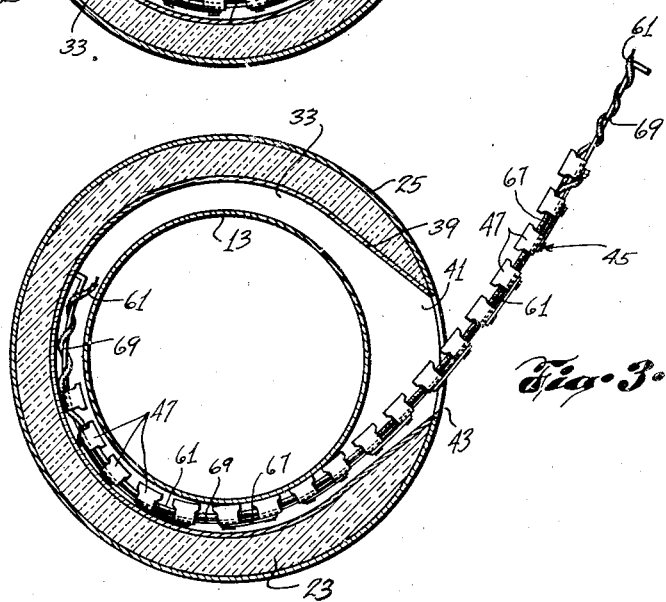
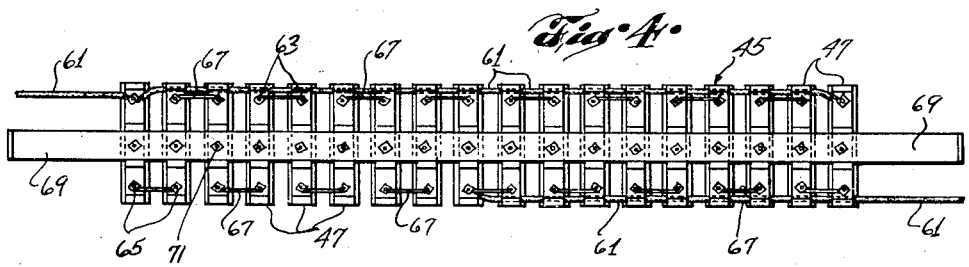
INVENTOR.
FRANK W. SCHARF
BY Roy M. Eilers
ATTORNEY.

Patented Dec. 7, 1937

2,101,691

UNITED STATES PATENT OFFICE 2,101,691

ELECTRIC WATER HEATER

Frank W. Scharf, Western Springs, Ill., assignor to McGraw Electric Company, Chicago, Ill., a corporation of Delaware Application November 29, 1935, Serial No. 52,024

13 Claims. (Cl. 219—39)

My invention relates to water heaters and more particularly to electric heaters for hot water tanks.

An object of my invention is to provide a relatively simple and efficient flexible electric water heater for a hot water tank.

Another object of my invention is to provide an electric heater assembly for a heat insulated tank that shall permit of easily and quickly removing a damaged heater element and replacing it by a new heater.

Another object of my invention is to provide means for easily and quickly clamping a flexible multiple element electric heater against a tank.

Other objects of my invention will either be apparent from the description of one form of device embodying my invention or will be pointed out in the course of such description.

In practicing my invention I provide a flexible band-like multiple-element electric heater adapted to be located around a hot water tank and to be clamped thereagainst, a tunnel-like casing being provided around the tank in heat-insulating material enclosing the same, said tunnel structure having an outer opening at one point. The flexible heater can be inserted into and removed from its operative position around the tank through the opening, which is normally closed by a cover plate supporting a thermostat and a control switch for the heater.

In the drawings,

Figure 1 is a view in vertical section through a water heater assembly embodying my invention, Fig. 2 is a horizontal lateral section therethrough taken on the line 2—2 of Fig. 1, Fig. 3 is a view in horizontal lateral section taken on the same plane as Fig. 2, but showing an intermediate stage of assembly or disassembly of the flexible heater.

Fig. 4 is a plan view of a multiple-element electric heater embodying my invention, Fig. 5 is a fragmentary sectional view taken on the line 5—5 of Fig. 1, and showing the means for clamping a tunnel-like structure around the tank, Fig. 6 is a view in front elevation of one resistor support, Fig. 7 is a longitudinal sectional view therethrough taken on the line 7—7 of Fig. 6, and Fig. 8 is a lateral sectional view through the single element shown in Fig. 6 and taken on the line 8—8 thereof.

Referring first to Fig. 1 of the drawings, I have there illustrated a water heater assembly designated in general by the numeral 11 and embodying an ordinary hot water tank 13 provided with a cold water inlet 15 and a hot water outlet 17 in a manner well known in the art. The assembly is supported on a plurality of legs 21 in a manner well known in the art.

In order to make the assembly as efficient as possible in regard to the conservation of heat, I prefer to surround the tank 13 over substantially its entire surface with a relatively thick layer of heat-insulating material 23 in a manner now well known in the art, and to protect the same by an outer casing 25 which may be made of thin sheet metal or of any other suitable material and having a bottom closure 27 and a top cover 29 associated therewith to protect the outer surface of the heat-insulating material 23. The top cover may be held in place by a nut or cap plug 30 screwed on a short piece of pipe fitting into a part of the hot water outlet.

I provide further a plurality of tunnels 31 and 33 in the heat insulating material, which tunnels are constituted by a plurality of pieces of sheet metal comprising a single flat arcuate piece of sheet metal 35 located at the top of a tunnel, a similar arcuate piece 37 located at the bottom of the tunnel, and an outer annular cover 39. The tunnel is provided with an opening 41 therein at one point in its circumference and the outer cover sheet 39 is adapted to be bent outwardly and to substantially abut the outer cover member 25 which is also provided with an opening 43 registering with the opening 41 in the tunnel. If desired, I may make the arcuate members 35 and 37 of a number of arcuate pieces whose ends overlap with each other, but this is a detail of manufacture, the object in general being to provide a substantially open tunnel around one or two peripheral points of the tank to receive a multiple element heating unit hereinafter to be described. The adjacent ends of the upper and lower arcuate walls 35 and 37 are bent laterally, as shown in Fig. 5 of the drawings, to provide clamping flanges 44 held by one or more short machine screws as shown.

A flexible band-like multiple element heater 45, shown more particularly in Fig. 4 of the drawings, comprises a plurality of refractory elongated bars 47 whose shape and contour is shown more particularly in Figs. 6 and 7 of the drawings, and whose cross-section is shown in Fig. 8 of the drawings. As there shown, each refractory bar comprises a body portion 49 which constitutes the rear portion of the block 47 and which has a front portion 51 which is slightly wider than the back portion 49 and which is provided with a plurality of laterally-extending recesses or saw cuts 53.

A resistor wire 55 is located in the lateral grooves or slots 53 and extends in zigzag fashion therein along the front part of the block 47, the return bent portions thereof seen in Fig. 6 of the drawings being located under the laterally projecting ends of the slotted portion 51.

Each block 47 is provided with an upper opening 57 and a lower opening 59 extending therethrough to receive therein relatively heavy current conductors 61 to permit of suitably energizing the resistor elements which may be connected either all in series or, as shown in Fig. 4 of the drawings, may be connected in such manner that half of the resistor supporting blocks 47 have their resistors connected in series and the two sets are connected in parallel. This, however, is a matter of choice, depending upon the size of wire to be used and upon the available voltage of the supply circuit.

The lateral grooves 53 do not extend over the entire front surface of each block 47, but stop short of each end thereof as will be seen by reference to Figs. 6 and 7, and terminal members 63 and 65 are provided at the upper and the lower ends of each block extending therethrough in order to permit of making the desired electrical connections between the individual blocks, which electrical connections are designated by numeral 67 in Fig. 4 of the drawings and may consist of an integral part of the resistor or of short pieces of copper wire, or any other suitable means for connecting the individual elements.

A flexible metal band 69 is provided to which each of the resistor-supporting blocks 47 is bolted as by means of short machine bolts 71 (see Fig. 7 of the drawings), the band 69 being located in a laterally-extending recess 72 in each block 47, the heads of these bolts being located in a relatively deep opening 73 in the mid-portion of each block so that the head of the metallic bolt will be located a suitable distance away from the resistor 55. Electric-insulating material 74 may be located between the resistor and the bolt. The general view of the assembled multiple-element heater is shown in Fig. 4, and this heater is shown in its proper operative position in a tunnel 31 in Fig. 2 of the drawings. It will be noted that the end portions of the flexible band 69 are bent laterally away from the adjacent portion and that a clamping bolt 75 is used to connect the two laterally projecting end portions of the band 69 whereby to draw it tightly around the individual blocks 47 causing them to closely operatively engage the outer surface of the tank 13.

A control box 77 is located in each of the openings 41 and supports a thermal control element shown as including a metallic bulb or enclosure 79 adapted to extend into the tank 13 through the wall thereof and to be protected by a well 80 of tubular shape having a water tight connection with the wall of the tank, whereby to provide means to control the energization of the heater 45. A knob 81 is associated with each thermal control means in order to adjust the same for different operating temperatures and if desired, a manual operable switch indicated by a knob 83 may be located in the structure 77 in order to permit of manually controlling the energization of the associated heater. The structure 77 may be supported by a front closure member 85 in the shape of an arcuate plate having its edge portions overlapping the outer cover 25 to which it may be secured by a plurality of small machine screws 87.

Referring now to Fig. 3 of the drawings, I have there illustrated the flexible band-like heater as in the process of being removed from the tunnel-like casing around the tank. In order to do this all that is necessary is to remove the front or outer closure plate 85 to disconnect from the control box 77 the leads 89 (see Fig. 2) extending between it and the heater and then to remove the clamping bolt 75. It is obvious that the band-like heater and particularly the lower ends of the blocks 47 will normally rest upon the upper surface of bottom plate 37 and the openings 41 and 43 are made large enough so that when the plate 85, and the control box and thermostat bulb are removed, it will be easy to pull out the band-like heater 45 by grasping one end of the band 69 and pulling it outwardly substantially as shown in Fig. 3 of the drawings.

After repair of this heater, it or a new heater unit may be inserted into its proper operative position in the tunnel-like casings by simply reversing the process of removing the same, that is, pushing one end of the heater through the aligned openings 41 and 43 until the first end has been pushed around through substantially 360° when it will be easily possible to insert the clamping bolt 75 through the laterally bent ends of the band 69 and clamp it tightly against the tank. The other connections, such as those to the control box 77, may then be made and the device is then ready for operation.

The device embodying my invention thus provides a relatively simple assembly for a flexible hot water heater applicable to hot water tanks, in which the heat from the electric resistor wires is applied directly against the outer surface of the tank and it is therefore possible to use a relatively low temperature heater so that deposits of solid matter in the tank will be almost entirely prevented since such deposits of lime and other chemicals are caused more particularly by relatively high temperature areas applied either to the tank or provided inside of the tank.

The device embodying my invention provides a heater which can be very easily and quickly located in its proper operative position or removed therefrom without disturbing the rest of the tank assembly, and in which the possibly granular heat insulating material usually placed around a tank of this kind will not directly operatively engage the heater unit itself.

While I have illustrated and described a specific embodiment of my invention, I do not desire to be limited thereto and desire that the appended claims shall be so construed as to cover all similar devices operative for the same purpose and that they shall be limited only by the prior art.

I claim as my invention:

1. A water heater assembly for a tank, including an annular compartment around the tank having top, bottom and outside walls and an opening in the outside wall and a flexible multi-element electric heater located in the compartment insertable into and removable from the compartment through said opening, and means to clamp said heater around said tank.

2. A water heater assembly for a tank having heat insulating material therearound, said assembly including a tunnel in the heat-insulating material having an outside opening therein at one point, a plurality of individual heating elements spaced around the tank, a flexible band to which the elements are secured adapted to clamp the elements against the tank and means to secure the ends of the band together to effect such clamping, the ends of the band being located at said opening in the tunnel.

3. A water heater assembly for a tank, said assembly comprising a tunnel extending around the tank having an outer opening therein and a band-like electric heating unit insertable into and removable from its operative position in said tunnel through said opening.

4. A water heater assembly for a tank having heat-insulating material therearound, said assembly comprising a tunnel in the heat insulating material extending around the tank having an outer opening therein, a flexibly mounted plurality of individual heating elements insertable into and removable from their operative positions in said tunnel through said opening and means located adjacent said opening and operable therethrough to tightly clamp the heating elements against the tank.

5. A water heater assembly for a tank having a layer of heat-insulating material therearound, said assembly including a metal casing having top, bottom and outer walls and an opening in the outer wall clamped around the tank, a flexible band-like electric heater insertable into and removable from its operative position in said casing, through said opening.

6. A water heater assembly for a tank having a layer of heat-insulating material therearound, said assembly comprising a tunnel in the heat-insulating material having an outside opening, a plurality of electric heating elements in the tunnel, spaced peripherally around the tank, a flexible strip located on the outside of the elements having its ends located at the opening in the tunnel and means operable through the opening to effect tight clamping engagement of the heating elements against the outer surface of the tank by the flexible strip.

7. A water heater assembly for a tank having a layer of heat-insulation therearound, said assembly comprising a flexible band-like multi-element electric heater encircling the tank and adapted to be tightly clamped therearound, and means for effecting removal of a damaged heater and insertion of a new heater without affecting said heat insulation, said means comprising an annular chamber having a top, a bottom and an outside wall with an opening in the outside wall and means to clamp the chamber around the tank.

8. A water heater assembly for a tank having a layer of heat insulating material therearound and an outer cover for the heat insulating material and having an opening therein, said assembly including a casing surrounding the tank, having a top, a bottom and an outer wall, the outer wall having an opening therein alined with the opening in the outer cover and being radially spaced from the outer cover except at the alined openings, a flexible multi-element electric heater located in said casing, insertable into and removable from its proper operative position through said alined openings in the casing and in the cover, a thermostatic control means for the heater operatively engaging the tank and a closure plate for the openings secured to the outer cover and supporting the thermostatic control means.

9. A water heater assembly for a tank, comprising a heat-insulated compartment extending around the tank and having a top, a bottom and an outer wall with an opening in said outer wall, a flexible electric heater located in said compartment and adapted to be removed therefrom through said opening and means operable through said opening to clamp the heater in tank-engaging position.

10. A device as set forth in claim 9 and including a cover member for the opening in said outer wall and a control box for the heater supported by the cover member.

11. A water heater adapted to be mounted on a hot water tank and comprising a plurality of refractory resistor-supporting bars, resistor wires supported by said bars adjacent to one face of the respective bars, a flexible clamping band adjacent to the other face of the respective bars, means securing each bar to the band, electric energizing conductors extending through certain of said bars and means to draw the ends of said band toward each other to clamp the bars against a tank.

12. A water heater adapted to be mounted on a hot water tank, comprising a plurality of refractory resistor-supporting bars, resistor wires supported by said bars adjacent to the inner faces thereof, a flexible clamping band located against the outer faces of the respective bars and having interfitting engagement therewith, bolts extending through the respective bars and the band to hold them in proper relative operative positions, energizing conductors supported by and extending through certain of the bars adjacent the ends thereof and means to draw the ends of the band toward each other to clamp the heater against a tank.

13. A water heater assembly for a tank including a compartment located against the outer surface of the tank and comprising top, bottom and outside walls and an opening in the outside wall and a flexible electric heater in the compartment insertable into and removable from the compartment through said opening, said heater including a plurality of electric-insulating bars, resistor wires supported by said bars adjacent the inner faces thereof, a flexible band having interfitting engagement with the respective bars at the outer faces thereof, bolts holding the respective bars against the band, energizing conductors extending through certain of the bars adjacent to the ends thereof and means to draw the ends of the band toward each other to clamp the bars against the tank.

FRANK W. SCHARF.